United States Patent
Appleby et al.

(10) Patent No.: US 10,666,697 B2
(45) Date of Patent: May 26, 2020

(54) MULTICAST TO UNICAST CONVERSION

(71) Applicant: BRITISH TELECOMMUNICATIONS PUBLIC LIMITED COMPANY, London (GB)

(72) Inventors: Stephen Appleby, London (GB); Ian Crabtree, London (GB); Timothy Stevens, London (GB); Rory Turnbull, London (GB); Ivan Roper, London (GB); Michael Nilsson, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 88 days.

(21) Appl. No.: 15/540,322

(22) PCT Filed: Dec. 14, 2015

(86) PCT No.: PCT/EP2015/079661
§ 371 (c)(1),
(2) Date: Jun. 28, 2017

(87) PCT Pub. No.: WO2016/107733
PCT Pub. Date: Jul. 7, 2016

(65) Prior Publication Data
US 2017/0366588 A1    Dec. 21, 2017

(30) Foreign Application Priority Data
Dec. 31, 2014    (EP) .................................. 14004457

(51) Int. Cl.
*H04L 29/06*    (2006.01)
(52) U.S. Cl.
CPC ...... *H04L 65/4076* (2013.01); *H04L 65/4084* (2013.01); *H04L 65/601* (2013.01); *H04L 65/605* (2013.01); *H04L 65/608* (2013.01)

(58) Field of Classification Search
CPC ............. H04L 65/4076; H04L 65/4084; H04L 65/601; H04L 65/605; H04L 65/608
See application file for complete search history.

(56) References Cited

U.S. PATENT DOCUMENTS

| | | | |
|---|---|---|---|
| 6,101,591 A * | 8/2000 | Foster ................ | H04N 21/4307 345/565 |
| 2003/0018966 A1 * | 1/2003 | Cook ..................... | H04N 7/165 725/2 |

(Continued)

OTHER PUBLICATIONS

Pantos et al. "HTTP Live Streaming / draft-pantos-http-live-streaming-14". Oct. 14, 2014. <https://tools.ietf.org/pdf/draft-pantos-http-live-streaming-14.pdf>. pp. 1-47. (Year: 2014).*

(Continued)

*Primary Examiner* — Christopher Biagini
(74) *Attorney, Agent, or Firm* — Nixon & Vanderhye P.C.

(57) ABSTRACT

Examples of the present invention provide a method of converting a multicast stream into unicast segments. In particular, sequence identifiers are generated based on a clock reference field in the transport stream packets that make up the multicast stream. Every time a new sequence identifier is calculated, a new unicast segment is generated and assigned with the new sequence identifier. Transport stream packets are placed into the new segment until a packet is processed that causes a new sequence identifier to be generated, at which point another new segment is generated and packets placed into that segment. In an improved method, random access indicators in the transports stream packets are used to further constrain when a new segment is generated, to ensure that new segments are coincident with a packet having a random access indicator. This improvement makes random access easier back and forth between and within a stream.

16 Claims, 7 Drawing Sheets

(56) References Cited

U.S. PATENT DOCUMENTS

| | | |
|---|---|---|
| 2009/0271832 A1 | 10/2009 | Park et al. |
| 2011/0119395 A1 | 5/2011 | Ha et al. |
| 2013/0024582 A1 | 1/2013 | Rodrigues |
| 2014/0068690 A1* | 3/2014 | Luthra ........... H04N 21/234309 725/110 |
| 2015/0172135 A1* | 6/2015 | Coppola ............. H04L 41/5019 709/203 |

OTHER PUBLICATIONS

"Recommended Practice: H.264/AVC Motion Imagery Coding". Feb. 27, 2014. <http://www.gwg.nga.mil/misb/docs/rp/RP0802.2.pdf>. pp. 1-20. (Year: 2014).*
International Search Report for PCT/EP2015/079661, dated Feb. 4, 2016, 2 pages.

* cited by examiner

Figure 1

```
#EXT-X-VERSION:3
#EXT-X-MEDIA-SEQUENCE:7794
#EXT-X-TARGETDURATION:15

#EXT-X-KEY:METHOD=AES-128,URI="https://priv.example.com/key.php?r=52"

#EXTINF:2.833,
http://media.example.com/fileSequence52-A.ts
#EXTINF:15.0,
http://media.example.com/fileSequence52-B.ts
#EXTINF:13.333,
http://media.example.com/fileSequence52-C.ts

#EXT-X-KEY:METHOD=AES-128,URI="https://priv.example.com/key.php?r=53"

#EXTINF:15.0,
http://media.example.com/fileSequence53-A.ts
```

MULTICAST TO UNICAST CONVERSION

This application is the U.S. national phase of International Application No. PCT/EP2015/079661 filed 14 Dec. 2015, which designated the U.S. and claims priority to EP Patent Application No. 14004457.9 filed 31 Dec. 2014, the entire contents of each of which are hereby incorporated by reference.

FIELD OF THE INVENTION

This invention relates to the field of converting a multicast media stream to unicast media segments, in particular to a method of generating and marking unicast segments.

BACKGROUND TO THE INVENTION

Currently linear media delivery, such as of live television channels, is delivered over IP networks uses one of two quite different networking technologies: one based on multicast and the other based on unicast. With multicast transmission, a single multicast stream carrying the content is pushed from a content server to multiple network nodes simultaneously, with those network nodes duplicating the content and forwarding to any subsequent nodes or clients as required. With unicast transmission, multiple streams of content are pulled from the server, one stream for each device consuming the content, typically using HTTP over TCP.

Multicast makes efficient use of the network when delivering the same content at the same time to many end devices. However, it often requires continual allocation of network resources regardless of the amount of viewing, so that channel is delivered through the network even if no-one is actually watching it. In addition, not all end devices, such as some tablets and smartphones, presently support multicast.

Unicast suffers from sending multiple copies of the same channel content through the network, but requires no usage-independent allocation of network resources. However, if audiences are expected to be small for a particular channel, it may be more efficient overall to deliver that channel over unicast instead. This means that for those parts of the network where a channel has no viewers, the channel is not delivered and the network capacity can be re-used. Unicast is also capable of delivering to all end devices.

The choice of unicast or multicast delivery for one or more channels is usually a basic architectural decision made early on in planning and difficult to change. However, it would be beneficial to be able to switch between multicast and unicast depending on viewing numbers for example, in order to utilise network resources as efficiently as possible.

US patent application 2013/0024582 describes a system and method for dynamically switching between unicast and multicast delivery of media content in response to changes in concurrent demand for access to the media content.

European patent application EP2767060 describes a system that encapsulates unicast traffic for tunnelling over multicast. Mark-ups are inserted into the multicast stream which can be used to de-encapsulate the traffic and re-create the unicast stream.

European patent application EP2586170 describes a general multicast to unicast conversion system, but does not address synchronisation or segmentation issues.

SUMMARY OF THE INVENTION

It is the aim of examples of the present invention to provide a method of generating unicast segments from a multicast stream that allows for seamless switching from one to the other.

According to one aspect of the present invention, there is provided a method of generating unicast segments from a multicast stream, said method comprising:
  receiving the multicast stream comprising a sequence of transport stream packets;
  generating a first sequence identifier;
  identifying the first transport stream packet having a random access indicator;
  generating a first unicast segment comprising the first transport stream packet, and allocating the first sequence identifier to the unicast segment;
  adding to the first unicast segment further transport stream packets, wherein the further transport stream packets are transport stream packets subsequent to the first transport stream packet in the sequence up to a second transport stream packet and until a second sequence identifier is generated, wherein the second transport stream packet is the transport stream packet that has a random access indicator, and the second sequence identifier is different from the first sequence identifier.

Each sequence identifier is preferably generated using a clock reference field associated with a respective transport stream packet. Otherwise, the sequence identifier may be generated from a global reference clock.

The transport stream packets may be MPEG-2 transport stream packets, and the clock reference field may be a programme clock reference field. The unicast segments may be HTTP Live Streaming segments, and the sequence identifier may be a media sequence identifier.

The core idea of the invention is to exploit data which is present in any MPEG-2 Transport Stream to determine the segment boundaries and segment identifiers for generated unicast segments. This data is always left in the clear, even when the stream is scrambled. Restricting the generation of new segments to packets having random access indicators ensures that the resulting segments can be more freely accessed, making switching between streams and within a given stream less restrictive.

By using a deterministic algorithm, driven entirely by the data in the Transport Stream, segmentation can be carried out at multiple network locations independently and produce compatible segments. Indeed, in the absence of packet loss, the segments should be identical. This allows switching freely between different network locations for segmentation, even during a session.

One big advantage of this is that a selection can be made as to whether to use multicast or not over certain portions of the delivery network according to say, audience size. This allows for the best use of network capacity by making sure that the most popular content at any moment uses multicast, whereas the less popular content uses unicast.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of converting a multicast stream into unicast segments. In particular, sequence identifiers are generated based on a clock reference field in the transport stream packets that make up the multicast stream. Every time a new sequence identifier is calculated, a new unicast segment is generated and assigned with the new sequence identifier. Transport stream packets are placed into the new segment until a packet is processed that causes a new sequence identifier to be generated, at which point another new segment is generated and packets placed into that segment. In an improved method, random access indicators in the transports stream packets are used to further constrain when a new segment is generated, to ensure that new segments are coincident with a packet having a random access indicator. This improvement makes random access easier back and forth between and within a stream.

Figure 1:
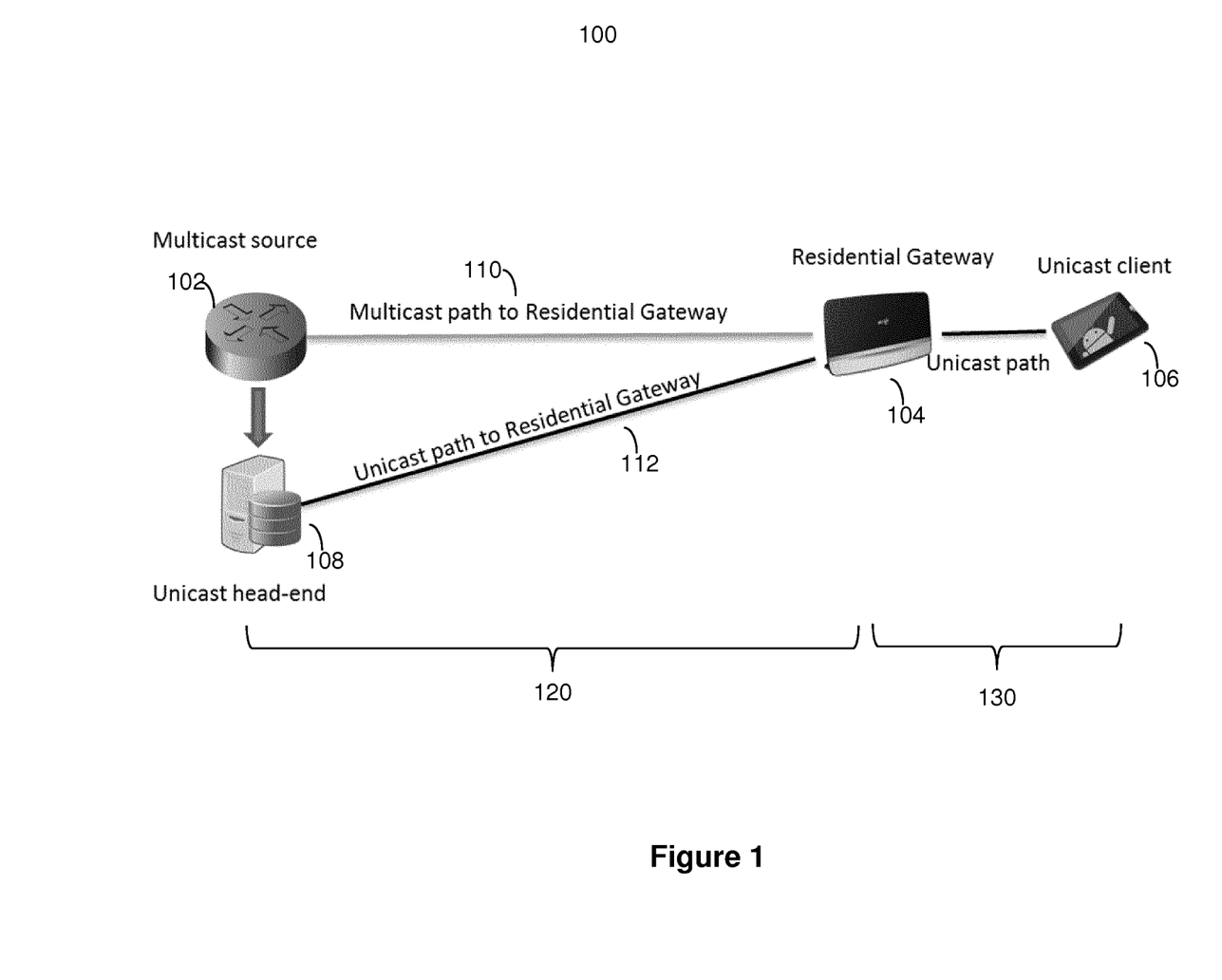
FIG. 1 is a network diagram in an example of the present invention showing the main media delivery paths.

FIG. 1 shows the main components and delivery paths of a media delivery network 100 in one example of the invention. The network 100 comprises a multicast server 102 communicating with a residential gateway 104 over a wide area network (WAN) 120 such as the Internet, and may further include a DSL line over the local loop to the customer premises. The multicast server 102 is adapted to provide content, here linear TV content, over multicast using MPEG-2 Transport Streams as specified in MPEG-2 Part 1, Systems standard, IS 13818-1. The network further comprises a unicast head-end server 108, which is adapted to provide content over unicast, and can communicate with the residential gateway 104. The multicast server 102 can communicate with the unicast head-end server 108 over the WAN 120.

A client device 106 can communicate with the residential gateway 104 over a local area network LAN 130, for example using WiFi. The client device 106 may be a tablet or smartphone for example. Content can be delivered to the client device 106 along two main paths:

(i) Content can be delivered over the WAN 120 by multicast from the multicast server 102 to the residential gateway 104 over a multicast path 110. The residential gateway 104 converts the content from the received multicast stream into unicast segments, making it available to the client device 106 using a standard unicast protocol.

(ii) Content can alternatively be delivered over the WAN 120 using a standard unicast protocol over a unicast path 112, where it is again made available as unicast content to the client device 106. The unicast head-end server 108 converts the content from the received multicast stream into unicast segments, making it available to the client device 106 using a standard unicast protocol in a manner similar to that at the residential gateway 104.

In this way, the process of making the content of a multicast stream available to the client device 106 over unicast can occur either at the unicast head-end server 108 or at the residential gateway 104. Examples of this invention provide a conversion module and corresponding method of operation that takes the multicast stream and converts it to unicast segments. The module can be located at the unicast head-end server 108 and the residential gateway 104. Thus, the selection of the place where the conversion occurs can be made dynamically, with the ability to switch from one to the other at certain points in the media stream.

The benefit of allowing this dynamic selection of whether unicast or multicast is used over the WAN 120 is that usage of the available network capacity is optimised. For example, those channels or programmes with a small audience size at any given time can be delivered over the WAN 120 over unicast, whilst those with larger audiences can be delivered by multicast over the WAN 120.

In this example, the MPEG-2 Transport Stream format is used for content delivery over multicast, which is the current standard practice.

On the unicast side, a variant of HTTP streaming which specifies the MPEG2 Transport Stream format is selected, which facilitates the conversion from multicast to unicast. As such, HTTP Live Streaming (HLS) is selected as the unicast streaming protocol.

To understand the invention, a discussion of the relevant features of HLS is provided, followed by a discussion of some details of the MPEG 2 Transport Stream format. Then follow two examples of the invention, both providing conversion between a multicast delivered MPEG 2 Transport Stream to a unicast HTTP Stream.

HTTP Live Streaming

A key principle of delivery over unicast using HTTP streaming is that a stream of media is segmented such that each segment can be considered to be a separate file. These segments each typically contain between 2 and 10 seconds of content. To stream content, the client issues an "HTTP GET" request for each segment in sequence. The client concatenates the segments to re-form the continuous stream.

Figure 2:
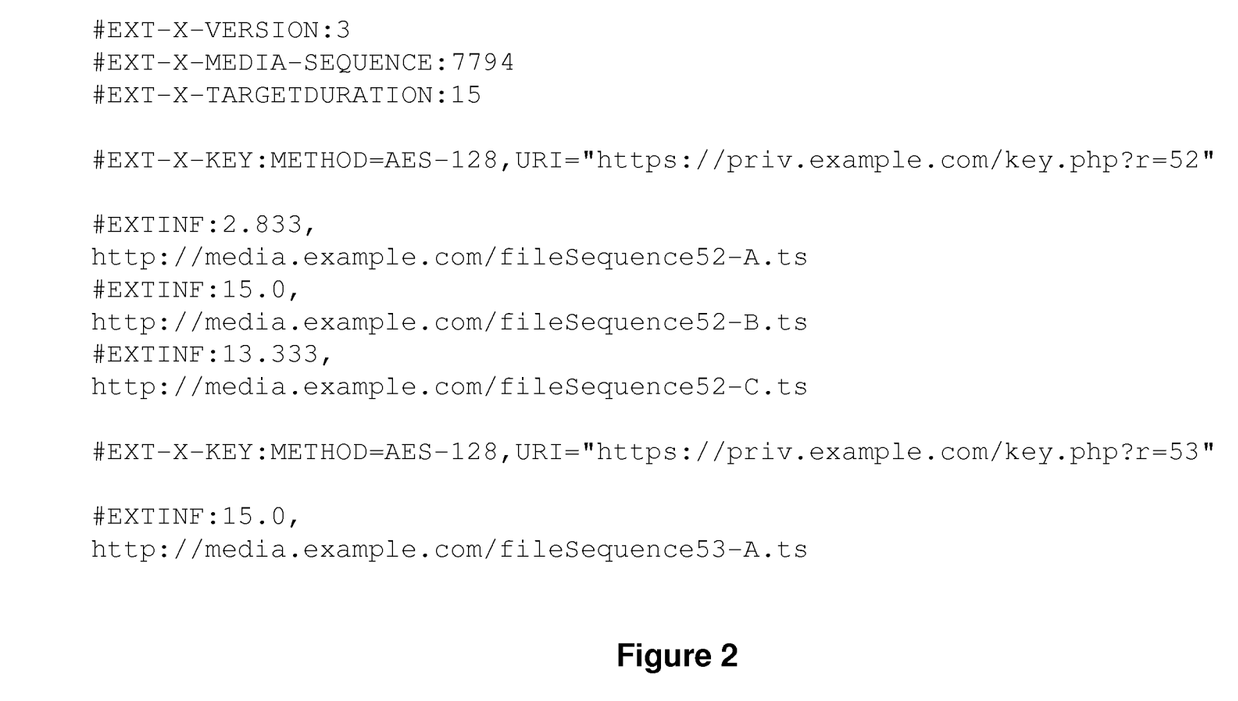
FIG. 2 is an example of an HTTP manifest file.

The client discovers which segments are available and the URLs to use for requesting these, by first requesting a "manifest", which describes all available segments. In HTTP Live Streaming (HLS), the manifest which lists the media segments is called a Media Manifest. An example of a Media Manifest is shown in FIG. 2. The Media Manifest includes a field identifying the media sequence index "EXT-X-MEDIA-SEQUENCE". The Media Sequence Index is used in HLS to reference the media segments. In the manifest in FIG. 2, the location of three segments is provided:

http://media.example.com/fileSequence52-A.ts
http://media.example.com/fileSequence52-B.ts
http://media.example.com/fileSequence52-C.ts The Media Sequence Index of the first segment is 7794, as set out in the parameter "EXT-X-MEDIA-SEQUENCE". The Media Sequence Index of the second and third segments are not explicitly set out, but are incremented from the specified index of the first segment. Thus, the second segment has a Media Sequence Index of 7795, and the third segment a Media Sequence Index of 7796.

HLS is often used with multiple bitrates of content, and allows switching between different bitrates at segment boundaries. This allows the media bitrate to be selected as a function of the bitrate deliverable by the network, and allows maximum quality to be achieved whilst reducing the likelihood of streaming impairments, such as buffer under-run which would result in stalled playout of the media.

Figure 3:
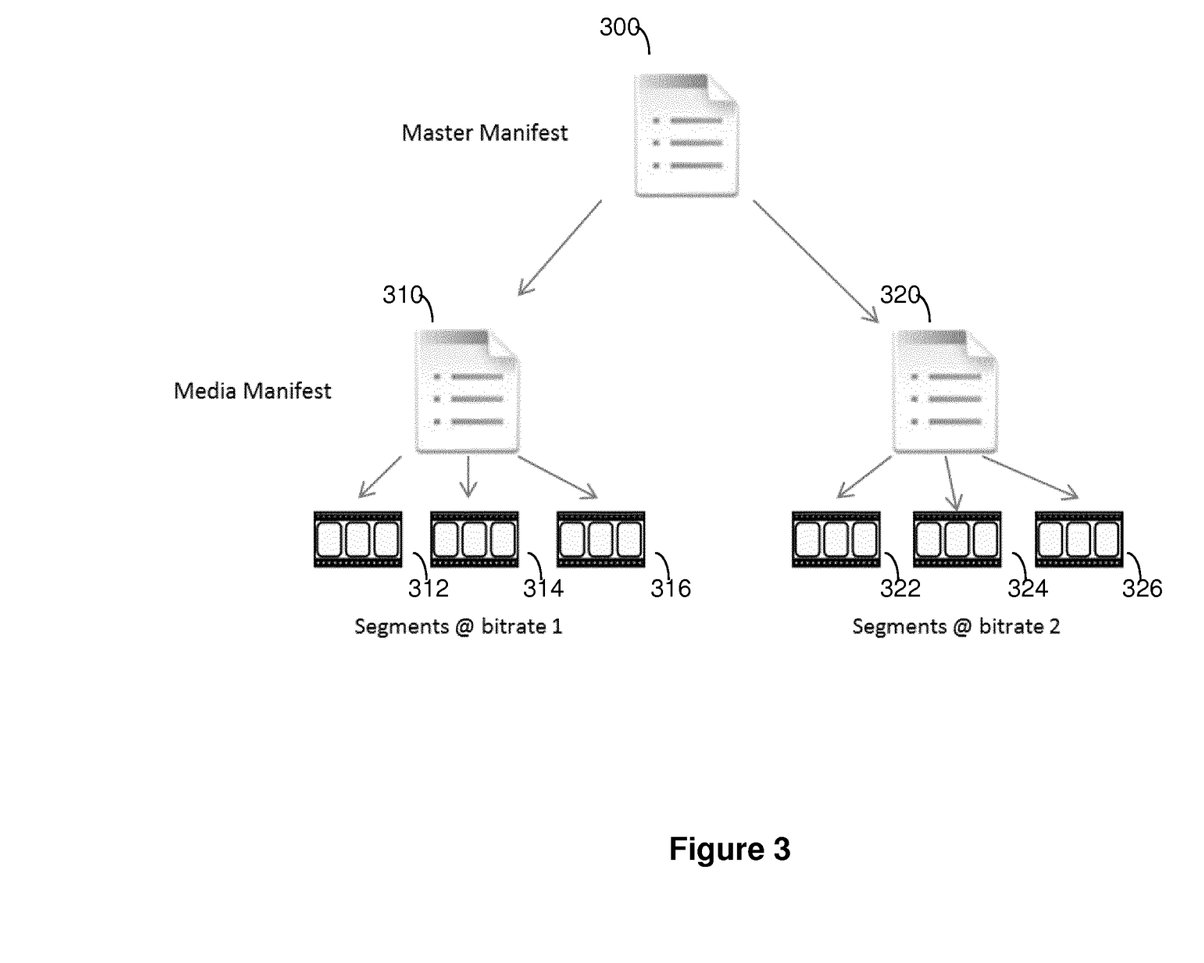
FIG. 3 is a diagram showing a hierarchy of manifest files.

In the case of HLS, there is a Master Manifest, which refers to separate Media Manifests for each media bitrate. FIG. 2 shows the hierarchy of the manifests, with a Master Manifest 300 pointing at Media Manifest 310 and Media Manifest 320. Media Manifest 310 refers to media segments 312, 314 and 316 which are encoded at bitrate 1, and Media Manifest 320 refers to media segments 322, 324 and 326 which are encoded at bitrate 2.

MPEG-2 Transport Streams

MPEG-2 Transport Streams are specified in MPEG-2 Part 1, Systems standard, IS 13818-1, and are often used for multicast streaming. An MPEG-2 Transport Stream consists of a sequence of small packets. The Transport Stream packets comprise a header portion and a payload portion. The packets are typically 188 bytes in length, though may be extended to 192 bytes with the addition of error correction information. Thus, several hundred or even thousands of transport stream packets will typically be required to carry content that is a second in duration, though this is largely dependent on the bitrate of the encoded content.

Figure 4:
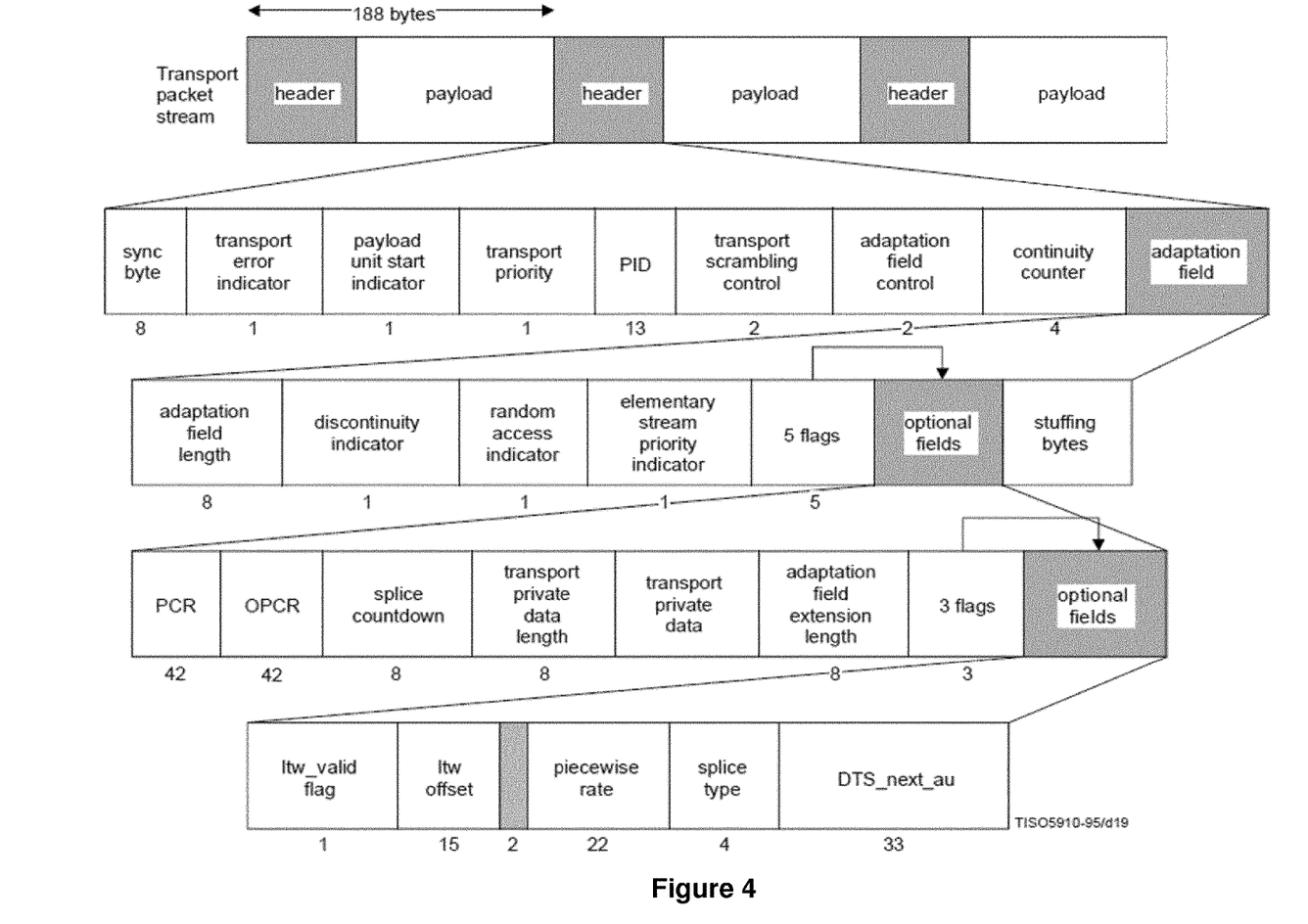
FIG. 4 illustrates the structure of an MPEG-2 Transport Stream packet.

FIG. 4 shows the structure of an MPEG-2 Transport Stream packet. Note that some reserved fields have been omitted for clarity.

MPEG-2 Transport Streams will typically contain a variety of different data types, Elementary Streams and Tables, carried in the payload portions of the packets. Elementary Streams carry the audio, video, subtitles etc that represent the media being streamed. A typical programme or sequence will have one video Elementary Stream, and several audio Elementary Streams (as there are usually multiple audio tracks), with each Elementary Stream made up of a large number Transport Stream packets. Additionally, there is also meta-data, which are represented as Tables and provide information important for understanding what data is being carried in which packets. Other Tables will contain programme guide data, service identification information, etc.

Each MPEG 2 Transport Stream packet will contain only one type of data—Elementary Stream or Table.

As illustrated in FIG. 4, each Transport Stream packet includes a Packet Identifier (PID) field in the header of the Transport Stream packet. The PID is assigned to each Elementary Stream or Table. Thus, all Transport Stream packets associated with a given Elementary Stream will have the same PID.

Two Tables that are always present in an MPEG-2 Transport Stream are a single Programme Association Table (PAT) and one or more Programme Map Tables (PMTs). The PAT contains an entry for each channel indicating the PID of the PMT for that channel or programme. The PMT for a channel contains the PIDs of the Elementary Streams for that channel. The Transport Stream packet containing the PAT is always assigned a PID of zero.

In this invention, information that remains unencrypted after the stream is scrambled (for the purposes of content protection) is utilised. The MPEG System Specification states that the PAT, the PMT (amongst other Tables) and the headers of Elementary Stream packets are left unencrypted.

Multicast to Unicast Conversion

Figure 5:
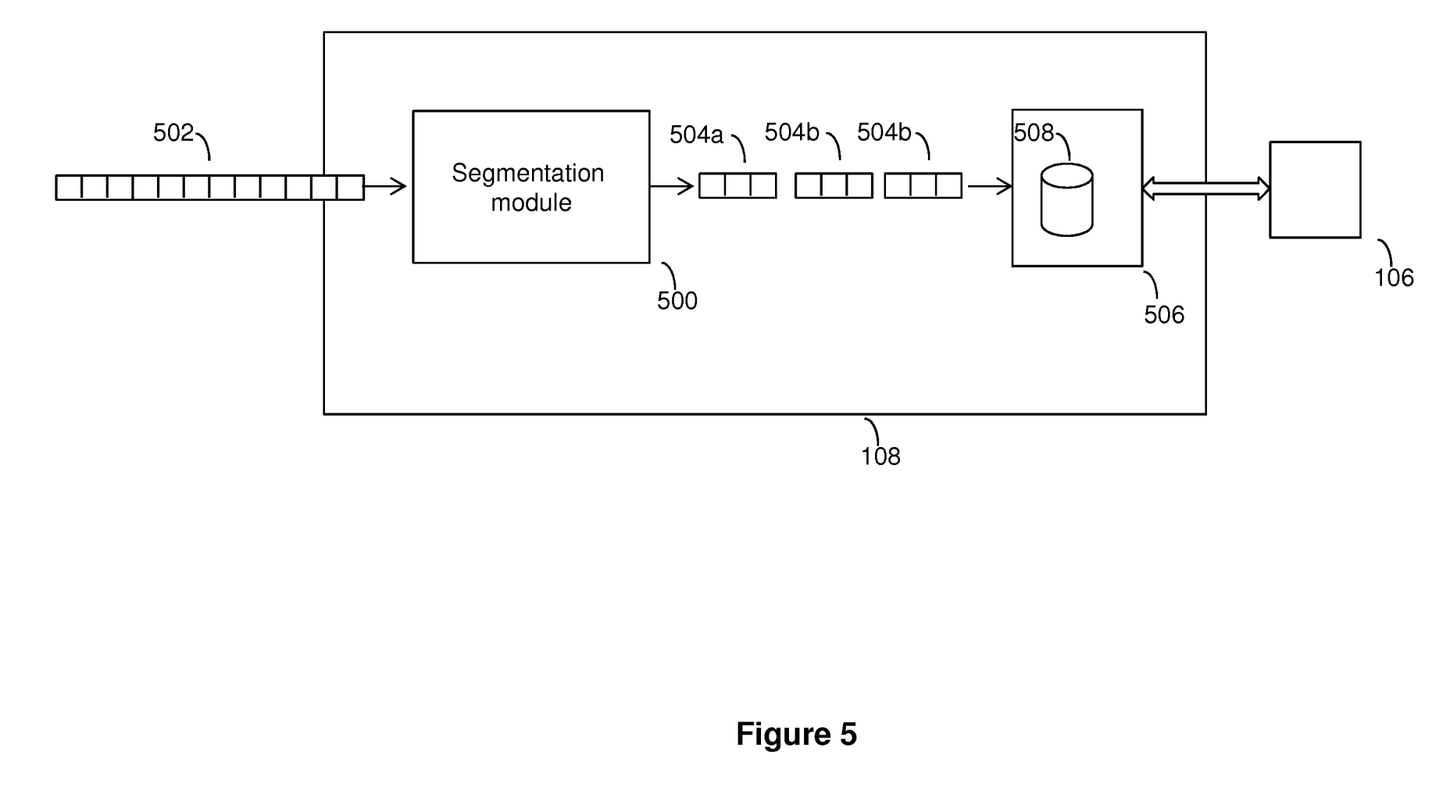
FIG. 5 is a diagram of a media segmenter in an example of the present invention.

For the invention to operate and allow the dynamic selection of unicast or multicast delivery over the WAN 120, a segmentation module 500 is introduced to processes the multicast stream and make it available by unicast.

FIG. 5 illustrates the segmentation module 500. The segmentation module 500 may be implemented in software, hardware, or a combination of the two. Here the segmentation module 500 is shown as residing in the unicast head-end server 108, but as suggested earlier, the segmentation module 500 can be deployed at both the unicast head-end server 108 and the residential gateway 104. The segmentation module 500 is adapted to receive a continuous stream of Transport Stream packets 502 arriving over multicast from the multicast server 102. The Transport Stream packets 502 are processed by the segmentation module 500, which determines how the stream of Transport Stream packets should be split into individual segments (here illustrated as segments 504a, 504b, and 504c), and to allocate Media Sequence Indices to these segments. Typically there will be several hundred of even thousands of Transport Stream packets in each segment. The resulting segments are stored in storage 508, where they can be accessed by an HTTP server 506. The client 106 can make HTTP requests to the HTTP server 506 for these segments as per standard HTTP Live Streaming. The segmentation module 500 can also generate a suitable Media Manifest referencing the generated segments, which is also stored in storage 508 and made available to the client 106 by the HTTP server 506.

The segmentation module 500 is designed to operate with the aim of trying to satisfy the following criteria:

The Media Sequence Index assigned to a given segment is be the same, irrespective of where the segmentation takes place, be it in the WAN 120 or the at the residential gateway 104. This ensures that the selection of where the unicast content is retrieved from can be made dynamically.

The incoming continuous Transport Stream is split into segments at the same points, irrespective of where the segmentation takes place, be it in the network or the at the residential gateway 104.

Furthermore, it is preferable that the Transport Stream is split in a manner that facilitates random access, which can for example be either random access from one point in a sequence to another point in the same sequence (e.g. rewinding a sequence), or random access between the same position in different sequences encoded at different bitrates.

In short, the segmentation module 500 is required to take a multicast stream and convert it to segments of a unicast stream whilst aiming to meet the criteria set out above.

In the following examples, the multicast Transport Stream corresponds to a single channel or programme, such as the television channel BBC1. Other channels can also be carried over multicast, but each will have its own multicast stream. Examples of the invention are applied to a single multicast stream/channel for simplicity.

Generating Media Sequence Indices and Segmentation

In a first example of the invention, the problem of generating HLS segments and generating Media Sequence Indices for marking those segments is examined. The method described is performed by the segmentation module 500.

As illustrated in FIG. 4, the Transport Stream packet header optionally contains a field labelled PCR—the Programme Clock Reference. The PCR field is 42 bits in length and contains samples of a notional PCR counter. The PCR counter is incremented at a rate of 27 MHz—separated into a 90 kHz counter (represented by 33 bits), and a fractional counter incrementing at 27 MHz (represented by 9 bits). The 9 bit portion will count up from 0 to 299, incrementing the 90 kHz counter each time it resets back to zero. The PCR counter thus has a cycle time of 2^33/90,000~26.5 hours. Note, the Transport Stream packet header, and thus the PCR field, is not encrypted.

For this invention, the PCR field is used to calculate a new parameter called call $clock_{seg}$. The Media Sequence Index for a segment can then be set to $clock_{seg}$.

$clock_{seg}$ is set as an integer, and defined as the solution to:

$$PCR = s \times clock_{seg} + r \qquad (1)$$

where,
s is an integer, calculated such that $clock_{seg}$ increments at an interval approximately equal to the required segment duration, and
r is the remainder such that $0<=r<s$.

Thus, s is calculated as the ratio of the $clock_{seg}$ period to the PCR period, or equivalently, as the product of the $clock_{seg}$ period and the PCR frequency.

For example, if segments of approximately 10 seconds long are required, the integer s is calculated such that $clock_{seg}$ increments every 10 seconds. Thus, s would have a value of:

$$s=27,000,000\times10=270,000,000$$

Thus, equation (1) is used by the segmentation module 500 to determine $clock_{seg}$ from the PCR field.

Typically, a PCR field is included in the headers of the packets of one the Elementary Streams, usually the Elementary Stream carrying the video data. However, they won't typically occur in every Transport Stream packet even for that Elementary Stream, just some of the Transport Stream packets of that Elementary Stream. The Standards Specification states that PCR samples must occur at least every 100 ms, and therefore the PCR field will be present in a packet at least every 100 ms.

The PID of the Elementary Stream that contains the PCR samples is set out in the PMT. Therefore, to identify which Transport Stream packet contains a PCR sample, first the PAT is identified (in the packet with PID=0). Then the packet containing the PMT is identified using the PID of the PMT from the PAT. The PMT is then examined to identify the PID of the Elementary Stream and packets containing the PCR samples. Finally, the Transport Stream packets with the PID identifying the PCR samples are examined to find the packets containing a PCR field.

$clock_{seg}$ is then calculated each time a PCR sample is found. There is no interpolation between PCR samples. In any case, interpolation could lead to misalignments between the segmentation carried out at different locations. Using this method, only unencrypted data is required from the transport stream headers and the PAT and PMTs.

It should be noted that whilst the PCR counter has a 27 MHz cycle, and the PCR field is sampled at least every 100 ms from the PCR counter, $clock_{seg}$ will not change every time the PCR field changes. This is because the parameters in equation (1) is set such that $clock_{seg}$ increments in line with the required segment length e.g. around 10 seconds. Therefore, in this example $clock_{seg}$ will only change in value every 10 seconds.

The segmentation module 500 utilises the incrementing of $clock_{seg}$ (every 10 seconds here) to determine which Transport Stream packets to place in a segment, by generating a new segment every time $clock_{seg}$ increments. Each new segment is assigned a Media Sequence Index equal to the new $clock_{seg}$, and all packets starting with the packet that caused $clock_{seg}$ to increment and up to but not including the next packet that causes $clock_{seg}$ to increment are placed in the new segment.

Figure 6:
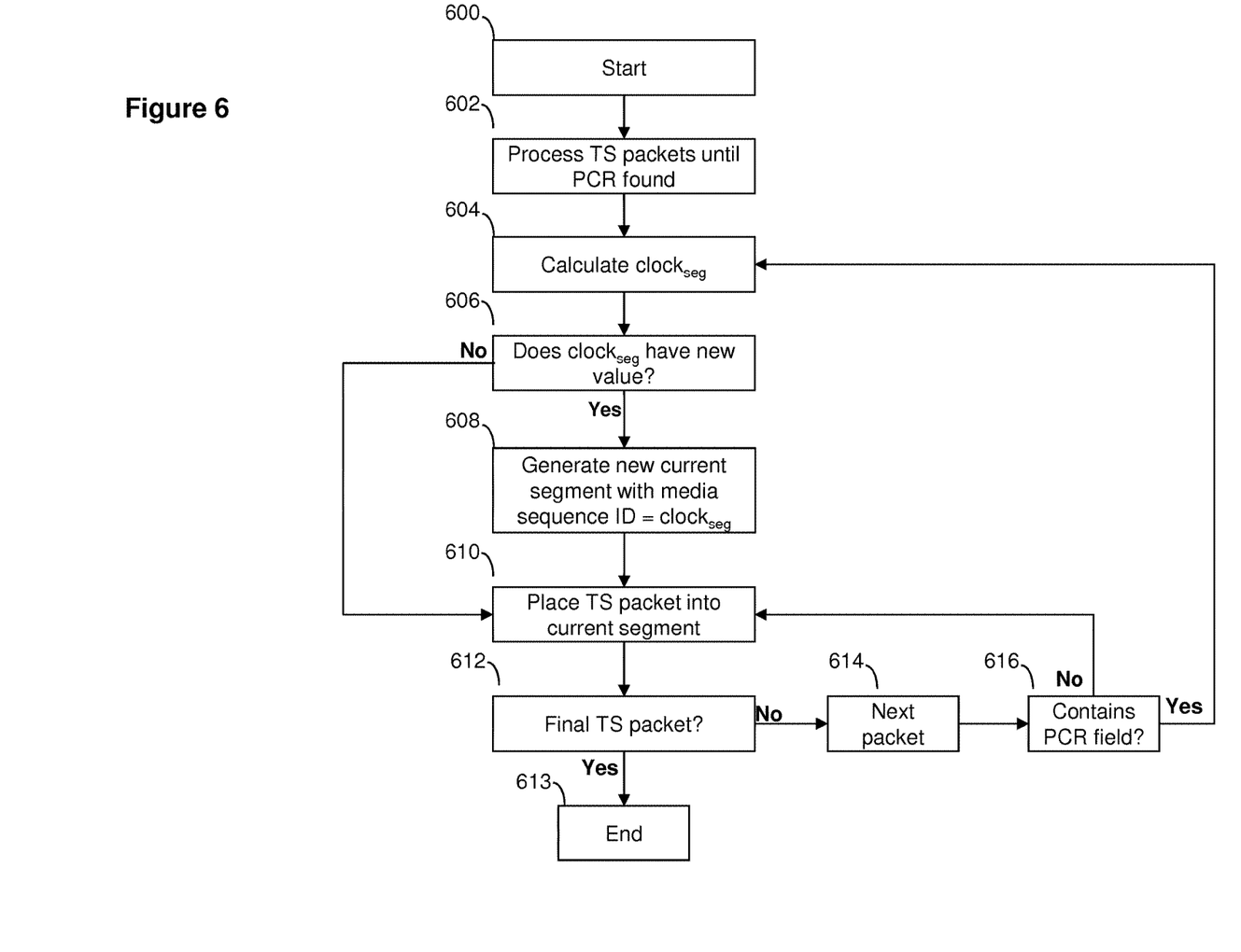
FIG. 6 is a flow chart summarising the operation of the segmentation module in one example of the invention.

There now follows a worked example with reference to the flow chart of FIG. 6 describing how the segmentation module 500 applies the above methods to received sequence of Transport Stream packets.

Processing starts at step 600. At step 602, the segmentation module 500 receives a continuous sequence of Transport Stream packets and starts processing them packet by packet. Initially, the packets are processed to identify until a packet containing a PCR field is identified as described above. The value of the PCR field is extracted from this packet, and used in step 604 to determine $clock_{seg}$ in accordance with equation (1) above, and using a suitable value for parameter s. In this example, s is selected to be 270,000,000 so that $clock_{seg}$ increments every 10 seconds.

In step 606, a check is done on $clock_{seg}$ to determine whether it has a new value. As this is the first time $clock_{seg}$ has been calculated, $clock_{seg}$ will have a new value, and thus processing passes to step 608. In step 608, a new current HLS segment is generated and assigned a Media Sequence Index equal to the calculated $clock_{seg}$.

In step 610, the Transport Stream packet is placed into the current segment.

In step 612, a check is made to determine if the packet being processed is the final Transport Stream packet, and if so, processing ends at step 613 and the segment is stored in the storage 508. The segmentation module 500 can also update any existing Media Manifest to reference the segment now stored, or create a new Media Manifest if one does not already exist. If this packet is not the final Transport Stream packet, the next Transport Stream packet is selected at step 614 and processing continues to step 616.

In step 616, a check is made to determine whether the packet includes a PCR field. In practice, there is no need to check each and every packet for a PCR field, as the PCR field will only be present in packets having a PID indicating a PCR field might be present as described above. Thus, only packets having such a PID need be checked, with any others assumed not to have a PCR field.

If there is no PCR field, then processing passes back up to step 610, where the Transport Stream packet is placed into the current segment, after which processing passes to step 612 to check if it is the final packet and so on.

Typically, a PCR field will only be present every 100 ms or less, so there will be many consecutive Transport Stream packets that do not have a PCR field after one that does.

Each of these Transport Stream packets will thus be processed in turn and placed into the current segment following the loop that is steps 610, 612, 614, 616, 610 and so on.

However, if in step 616 a Transport Stream packet is examined and does have a PCR field, then processing passes back up to step 604, and $clock_{seg}$ is calculated using the value from the PCR field.

In step 606, a check is performed to determine if $clock_{seg}$ is new. Note, even with a new PCR value, the resulting $clock_{seg}$ may not change, as the parameter s in equation (1) is deliberately chosen in this example so that $clock_{seg}$ increments every 10 seconds. If $clock_{seg}$ is not new, then processing simply passes down to 610, where the Transport Stream packet is placed into the current segment. However, if $clock_{seg}$ is new, then processing passes to step 608, where a new HLS segment is generated and assigned a Media Sequence Index equal to the new $clock_{seg}$. The previous segment can then be stored in the storage 508. The segmentation module 500 can also update or create a new Media Manifest as required referencing the location of the stored segment as required.

After creating a new segment, the Transport Stream packet is placed in it in step 610, and processing passes to step 612 as before, cycling through any subsequent Transport Stream packets.

Since the above approach for calculating $clock_{seg}$, and subsequently generating segments, as well as assigning Media Sequence Indices to those segments, is dependent only on access to the PCR field in the Transport Stream packets, it can be implemented consistently by the segmentation module 500 whether it is located in the unicast head-end server 108 or the residential gateway 104. Thus, unicast segments can be generated at both the unicast head-end server 108 and the residential gateway 104 from the same multicast stream generated by the multicast source 102, which allows dynamic switching between the unicast sources according to network usage or as required.

In the example above, $clock_{seg}$ and the Media Sequence Index are effectively the same. However, in the next example, when a Media Sequence Index is assigned to $clock_{seg}$ is more carefully controlled.

Generating Segments with Random Access Capability

In a second example of the invention, an improved approach to segmentation which supports random access capability is described.

Almost all encoded video content is encoded using a mixture of picture types, typically I-frames, which can be decoded in isolation, and P and B-frames, which reference other frames and thus cannot be properly decoded by themselves. Using the method described above, the segments generated from the multicast stream won't necessarily start at a picture that can be played back in isolation. This can causes problems if trick play (e.g. fast forward and rewind) and also switching between different bitrate streams are to be supported. Using the above method, moving between non-consecutive segments corresponding to different parts of the stream may not coincide with an I-frame, and thus result in corrupted playback as it may not be possible to decode the pictures properly. This alternative example of segmentation helps overcome this problem, allowing for better random access of the segments generated.

In this example, segmentation is performed according to FIG. 6 by the segmentation module 500 and as described above, but modified using random access points in the multicast Transport Stream.

Random access points occur at Transport Stream packets marked with a flag in a random access indicator field in the header of the packet as shown in FIG. 4. The random access indicator is a 1 bit field that is set to 1 if the packet starts a video (or audio) sequence, such as at an I-frame or at the start of a group of pictures (GOP).

Firstly, the approach described earlier for calculating $clock_{seg}$ is used. However, in this example, if $clock_{seg}$ is new, a new segment should only be generated and marked with a Media Segment Index equal to $clock_{seg}$ when a random access indicator is present (field set to 1) in a Transport Stream packet. Thus, the current packet being processed will be placed into the current segment unless there is a random access indicator in the current segment and $clock_{seg}$ is new (has been incremented), in which case a new segment is generated, marked with the new Media Segment Index, and the current packet placed in the new segment instead.

Figure 7:
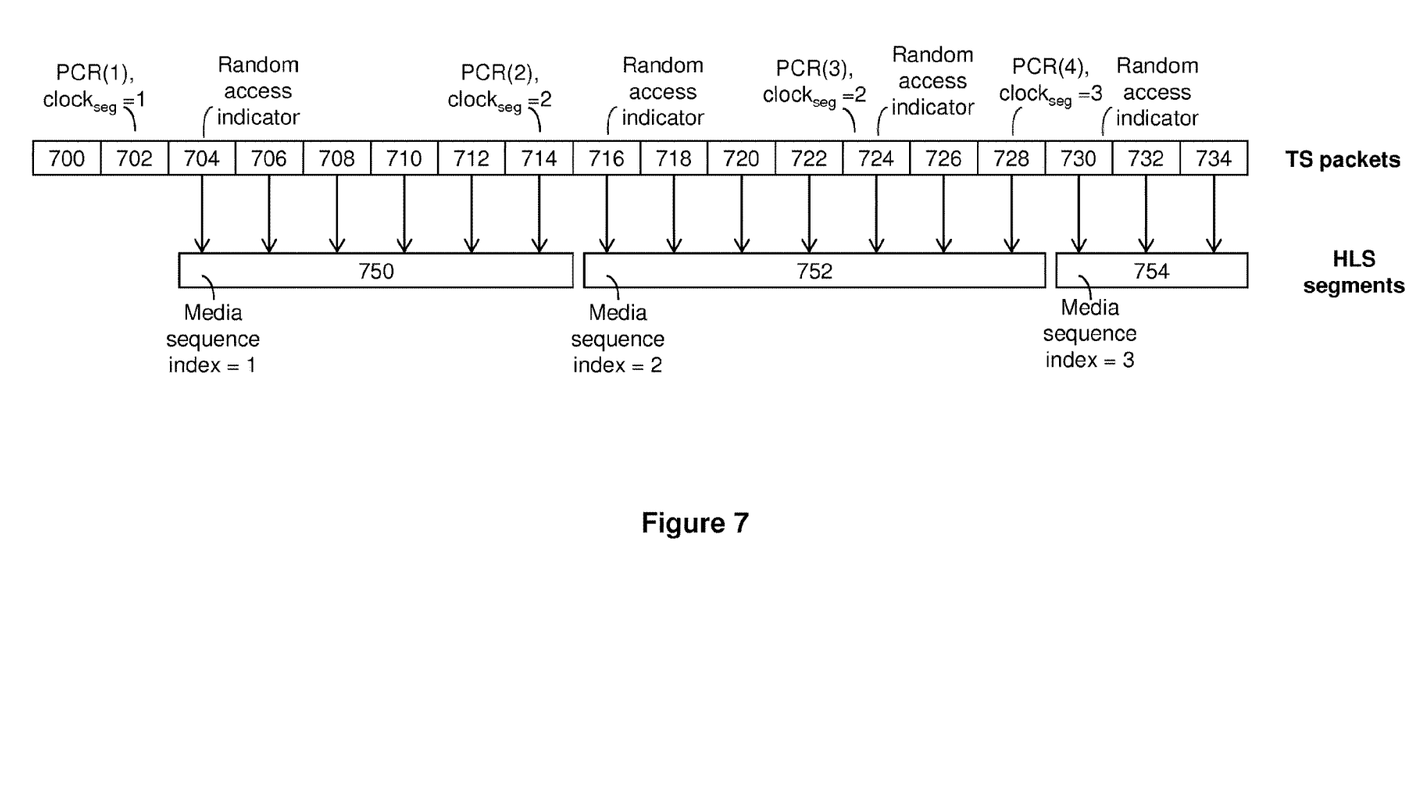
FIG. 7 is a diagram illustrating the processing of a sequence of Transport Stream packets into HLS segments in another example of the invention.

This example is illustrated in FIG. 7, which shows a sequence of Transport Stream packets 700 to 734 received and processed by the segmentation module 500 into HLS segments 750, 752 and 754. It is assumed that the packets containing the PCR field have already been identified as described earlier.

The first Transport Stream packet containing a PCR field is 702. In this example, the PCR field in packet 702 has a value of 1 and results in a calculated $clock_{seg}$ of 1, a new value for $clock_{seg}$. However, as packet 702 does not contain a random access indicator, a new segment is not yet generated. Processing then passes to the next Transport Stream packet, packet 704, which does contain a random access indicator. Thus, it is at this point that a new segment 750 is created, marked with a Media Sequence Index set to the calculated $clock_{seg}$ of 1, and the packet 704 placed into the segment 750. Processing then continues with the subsequent packets of 706 to 712, each of which is placed into segment 750.

Packet 714 is processed next, which contains a PCR field with a value of 2, which in turn results in a calculated $clock_{seg}$ of 2, a new value of $clock_{seg}$. However, as packet 714 does not also contain a random access indicator, packet 714 is placed into existing segment 750 even though $clock_{seg}$ is new, and creation of a new segment is delayed until a random access indicator is reached.

Packet 716 is processed next, and is found to have a random access indicator. Thus, a new segment, segment 752, is generated and marked with a Media Sequence Index set to the calculated $clock_{seg}$ of 2 (generated when packet 714 was processed), and the packet 716 placed into the new segment 752. Processing then continues with the subsequent packets of 720 to 726, each of which is placed into segment 752. Note, whilst packet 724 contains a PCR field and a random access indicator, it is still placed into segment 752, as the calculated $clock_{seg}$ (and resulting Media Sequence Index) remained at 2 at that point (same as the earlier $clock_{seg}$) and is not new.

Packet 728 is processed next, which contains a PCR field with a value of 4, which in turn results in a calculated $clock_{seg}$ of 3, a new value for $clock_{seg}$. However, as packet 728 does not also contain a random access indicator, packet 728 is placed into existing segment 752, and creation of a new segment is delayed until a random access indicator is reached.

Packet 730 is processed next, and is found to have a random access indicator. Thus, a new segment, segment 754, is generated and marked with a Media Sequence Index set to the calculated $clock_{seg}$ of 3, and the packet 730 placed into the new segment 754. Processing then continues with the subsequent packets of 732 and 734, both of which are placed into segment 754.

Subsequent packets are processed accordingly.

This alternative example is based on first example above and largely follows FIG. 6 but with the generating of new segments delayed until a random access indicator is observed in a packet. However, it should be noted that the specific method for calculating a value of the Media Sequence Index based on using the PCR field to calculate $clock_{seg}$ is not essential. Instead, the multicast sequence can still be segmented at packet boundaries marked with random access indicators, but an alternative method for generating Media Sequence Indices can be used. For example, a global reference clock can be used instead, such the clock from a GPS signal, with a Media Sequence Indicator generated every time that clock increments by a suitable interval. The Media Sequence Indicator would be associated with whichever packet was being processed at the time in the same way that $clock_{seg}$ is associated with a given packet. A global reference clock would ensure consistent generation of Media Sequence Indices wherever the segmentation module 500 is located. However, if there are discrepancies (e.g. jitter or delay) in the delivery of the multicast stream to a segmentation module located at differing sites, then problems will arise as a result of multicast stream itself being received and thus processed out of sync at the different sites. This is why the first example, which effectively utilises a clock embedded within the stream itself, is particularly advantageous.

Whilst the above methods have been described with reference to the MPEG-2 Transport Stream standard, and also the HTTP Live Streaming standard, the methods can be applied to other standards.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of generating unicast segments from a multicast stream, said method comprising:
   receiving the multicast stream comprising a sequence of transport stream packets;
   generating a first sequence identifier;
   identifying a first transport stream packet in the sequence of transport stream packets that has a first random access indicator;
   generating a first unicast segment comprising the first transport stream packet, and allocating the first sequence identifier to the unicast segment;
   adding to the first unicast segment further transport stream packets, wherein the further transport stream packets are transport stream packets subsequent to the first transport stream packet in the sequence of transport stream packets up to receipt of a second transport stream packet and until a second sequence identifier is generated, wherein the second transport stream packet is a transport stream packet in the sequence of transport stream packets that has a second random access indicator, and the second sequence identifier is different from the first sequence identifier;
   responsive to receipt of the second transport stream packet and generation of the second sequence identifier, generating a second unicast segment comprising the second transport stream packet and allocating the second sequence identifier to the second unicast segment; and
   adding to the second unicast segment additional transport stream packets, wherein the additional transport stream packets are transport stream packets received subsequent to receipt of the second transport stream packet in the sequence of transport stream packets and after generation of the second sequence identifier.

2. The method according to claim 1, wherein each sequence identifier is generated using a clock reference field associated with a respective transport stream packet.

3. The method according to claim 1, wherein each sequence identifier is generated from a global reference clock.

4. The method according to claim 1, wherein the transport stream packets are MPEG-2 transport stream packets, and each of the first and second sequence identifiers is generated from a clock reference field associated with a respective packet of the transport stream packets.

5. The method according to claim 1, wherein the unicast segments are HTTP Live Streaming segments, and the sequence identifier is a media sequence identifier.

6. The method according to claim 1, further comprising:
   generating the unicast segments, including the first and second unicast segments, at both a first computer server and a second computer server located at different network locations; and
   dynamically switching between the first computer server and the second computer server as a source of the unicast segments.

7. The method according to claim 1, further comprising:
   dynamically selecting the multicast stream or the unicast segments including the first and second unicast segments for content delivery over a computer network.

8. The method according to claim 1, further comprising:
   delaying generation of a third unicast segment after the second unicast segment until a third transport stream packet having a third random access indicator is received and a third sequence identifier is generated.

9. A computer system including computer hardware for executing computer software such that the computer system is at least configured to:
   receive the multicast stream comprising a sequence of transport stream packets;
   generate a first sequence identifier;
   identify a first transport stream packet in the sequence of transport stream packets that has a first random access indicator;
   generate a first unicast segment comprising the first transport stream packet, and allocating the first sequence identifier to the unicast segment;
   add to the first unicast segment further transport stream packets, wherein the further transport stream packets are transport stream packets subsequent to the first transport stream packet in the sequence of transport stream packets up to receipt of a second transport stream packet and until a second sequence identifier is generated, wherein the second transport stream packet is a transport stream packet in the sequence of transport stream packets that has a second random access indicator, and the second sequence identifier is different from the first sequence identifier;
   responsive to receipt of the second transport stream packet and generation of the second sequence identifier, generate a second unicast segment comprising the second transport stream packet and allocating the second sequence identifier to the second unicast segment; and
   add to the second unicast segment additional transport stream packets, wherein the additional transport stream packets are transport stream packets received subsequent to receipt of the second transport stream packet in the sequence of transport stream packets and after generation of the second sequence identifier.

10. The computer system according to claim 9, wherein each sequence identifier is generated using a clock reference field associated with a respective transport stream packet.

11. The computer system according to claim 9, wherein each sequence identifier is generated from a global reference clock.

12. The computer system according to claim 9, wherein the transport stream packets are MPEG-2 transport stream packets, and each of the first and second sequence identifiers is generated from a clock reference field associated with a respective packet of the transport stream packets.

13. The computer system according to claim 9, wherein the unicast segments are HTTP Live Streaming segments, and the sequence identifier is a media sequence identifier.

14. The computer system according to claim 9, further comprising:
   a first computer server and a second computer server located at different network locations; wherein
   the computer system is further configured to:
      generate the unicast segments, including the first and second unicast segments, at both the first computer server and the second computer server; and dynamically switch between the first computer server and the second computer server as a source of the unicast segments.

15. The computer system according to claim 9, wherein the computer system is further configured to:
dynamically select the multicast stream or the unicast segments including the first and second unicast segments for content delivery over a computer network.

16. The computer system according to claim 9, wherein the computer system is further configured to:
delay generation of a third unicast segment after the second unicast segment until a third transport stream packet having a third random access indicator is received and a third sequence identifier is generated.

* * * * *